(12) United States Patent
Duong et al.

(10) Patent No.: US 12,533,615 B2
(45) Date of Patent: Jan. 27, 2026

(54) METHODS AND SYSTEMS FOR REDUCING CONTAMINANTS IN A FEED STREAM

(71) Applicant: MARATHON PETROLEUM COMPANY LP, Findlay, OH (US)

(72) Inventors: Nhien Duong, Findlay, OH (US); Montri Vichailak, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/377,882

(22) Filed: Oct. 9, 2023

(65) Prior Publication Data

US 2024/0399279 A1 Dec. 5, 2024

Related U.S. Application Data

(60) Provisional application No. 63/470,739, filed on Jun. 2, 2023.

(51) Int. Cl.
| | |
|---|---|
| *B01D 19/00* | (2006.01) |
| *B01D 46/00* | (2022.01) |
| *B01D 46/44* | (2006.01) |
| *B01D 46/62* | (2022.01) |
| *B01D 46/66* | (2022.01) |
| *C10G 31/09* | (2006.01) |
| *C10G 55/08* | (2006.01) |

(52) U.S. Cl.
CPC ..... *B01D 46/0027* (2013.01); *B01D 19/0063* (2013.01); *B01D 46/446* (2013.01); *B01D 46/62* (2022.01); *B01D 46/66* (2022.01); *B01D 2275/30* (2013.01); *C10G 31/09* (2013.01); *C10G 55/08* (2013.01)

(58) Field of Classification Search
CPC .... B01D 46/0027; B01D 46/62; B01D 46/66; B01D 46/446; B01D 19/0063; B01D 2275/30; C10G 31/09; C10G 55/08
USPC .......................................................... 95/20
See application file for complete search history.

(56) References Cited

U.S. PATENT DOCUMENTS

| | | |
|---|---|---|
| 981,434 A | 1/1911 | Lander |
| 1,526,301 A | 2/1925 | Stevens |
| 1,572,922 A | 2/1926 | Govers et al. |
| 1,867,143 A | 7/1932 | Fohl |

(Continued)

FOREIGN PATENT DOCUMENTS

| | | |
|---|---|---|
| AT | 11772 U1 | 4/2011 |
| BR | PI0701518 | 11/2008 |

(Continued)

OTHER PUBLICATIONS

Platvoet et al., Process Burners 101, American Institute of Chemical Engineers, Aug. 2013.

(Continued)

*Primary Examiner* — T. Bennett McKenzie
(74) *Attorney, Agent, or Firm* — Ray Quinney & Nebeker P.C.; Paul N. Taylor

(57) ABSTRACT

Systems and methods for methods and systems for reducing contaminants in a feed stream are disclosed. Prior to reaching or upstream from one or more compressors, solid foulant is filtered from a feed stream. The compressor may further filter the feed stream. By reducing the solid foulant entering the one or more compressors, performance and life span of the one or more compressors also can be increased.

22 Claims, 7 Drawing Sheets

(56) References Cited

U.S. PATENT DOCUMENTS

| | | |
|---|---|---|
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,798,463 A | 1/1989 | Koshi |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Cenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |

(56) References Cited

U.S. PATENT DOCUMENTS

| | | | |
|---|---|---|---|
| 5,201,850 A | 4/1993 | Lenhardt et al. | |
| 5,203,370 A | 4/1993 | Block et al. | |
| 5,211,838 A | 5/1993 | Staubs et al. | |
| 5,212,129 A | 5/1993 | Lomas | |
| 5,221,463 A | 6/1993 | Kamienski et al. | |
| 5,223,714 A | 6/1993 | Maggard | |
| 5,225,679 A | 7/1993 | Clark et al. | |
| 5,230,498 A | 7/1993 | Wood et al. | |
| 5,235,999 A | 8/1993 | Lindquist et al. | |
| 5,236,765 A | 8/1993 | Cordia et al. | |
| 5,243,546 A | 9/1993 | Maggard | |
| 5,246,860 A | 9/1993 | Hutchins et al. | |
| 5,246,868 A | 9/1993 | Busch et al. | |
| 5,248,408 A | 9/1993 | Owen | |
| 5,250,807 A | 10/1993 | Sontvedt | |
| 5,257,530 A | 11/1993 | Beattie et al. | |
| 5,258,115 A | 11/1993 | Heck et al. | |
| 5,258,117 A | 11/1993 | Kolstad et al. | |
| 5,262,645 A | 11/1993 | Lambert et al. | |
| 5,263,682 A | 11/1993 | Covert et al. | |
| 5,301,560 A | 4/1994 | Anderson et al. | |
| 5,302,294 A * | 4/1994 | Schubert | E21B 43/34 96/183 |
| 5,316,448 A | 5/1994 | Ziegler et al. | |
| 5,320,671 A | 6/1994 | Schilling | |
| 5,326,074 A | 7/1994 | Spock et al. | |
| 5,328,505 A | 7/1994 | Schilling | |
| 5,328,591 A | 7/1994 | Raterman | |
| 5,332,492 A | 7/1994 | Maurer et al. | |
| 5,338,439 A | 8/1994 | Owen et al. | |
| 5,348,645 A | 9/1994 | Maggard et al. | |
| 5,349,188 A | 9/1994 | Maggard | |
| 5,349,189 A | 9/1994 | Maggard | |
| 5,354,451 A | 10/1994 | Goldstein et al. | |
| 5,354,453 A | 10/1994 | Bhatia | |
| 5,361,643 A | 11/1994 | Boyd et al. | |
| 5,362,965 A | 11/1994 | Maggard | |
| 5,370,146 A | 12/1994 | King et al. | |
| 5,370,790 A | 12/1994 | Maggard et al. | |
| 5,372,270 A | 12/1994 | Rosenkrantz | |
| 5,372,352 A | 12/1994 | Smith et al. | |
| 5,381,002 A | 1/1995 | Morrow et al. | |
| 5,388,805 A | 2/1995 | Bathrick et al. | |
| 5,389,232 A | 2/1995 | Adewuyi et al. | |
| 5,404,015 A | 4/1995 | Chimenti et al. | |
| 5,415,025 A | 5/1995 | Bartman et al. | |
| 5,416,323 A | 5/1995 | Hoots et al. | |
| 5,417,843 A | 5/1995 | Swart et al. | |
| 5,417,846 A | 5/1995 | Renard | |
| 5,423,446 A | 6/1995 | Johnson | |
| 5,431,067 A | 7/1995 | Anderson et al. | |
| 5,433,120 A | 7/1995 | Boyd et al. | |
| 5,435,436 A | 7/1995 | Manley et al. | |
| 5,443,716 A | 8/1995 | Anderson et al. | |
| 5,446,681 A | 8/1995 | Gethner et al. | |
| 5,452,232 A | 9/1995 | Espinosa et al. | |
| RE35,046 E | 10/1995 | Hettinger et al. | |
| 5,459,677 A | 10/1995 | Kowalski et al. | |
| 5,472,875 A | 12/1995 | Monticello | |
| 5,474,607 A | 12/1995 | Holleran | |
| 5,475,612 A | 12/1995 | Espinosa et al. | |
| 5,476,117 A | 12/1995 | Pakula | |
| 5,490,085 A | 2/1996 | Lambert et al. | |
| 5,492,617 A | 2/1996 | Trimble et al. | |
| 5,494,079 A | 2/1996 | Tiedemann | |
| 5,507,326 A | 4/1996 | Cadman et al. | |
| 5,510,265 A | 4/1996 | Monticello | |
| 5,516,969 A | 5/1996 | Krasznai et al. | |
| 5,532,487 A | 7/1996 | Brearley et al. | |
| 5,540,893 A | 7/1996 | English | |
| 5,549,814 A | 8/1996 | Zinke | |
| 5,556,222 A | 9/1996 | Chen | |
| 5,559,295 A | 9/1996 | Sheryll | |
| 5,560,509 A | 10/1996 | Laverman et al. | |
| 5,569,808 A | 10/1996 | Cansell et al. | |
| 5,573,032 A | 11/1996 | Lenz et al. | |
| 5,584,985 A | 12/1996 | Lomas | |
| 5,596,196 A | 1/1997 | Cooper et al. | |
| 5,600,134 A | 2/1997 | Ashe et al. | |
| 5,647,961 A | 7/1997 | Lofland | |
| 5,652,145 A | 7/1997 | Cody et al. | |
| 5,675,071 A | 10/1997 | Cody et al. | |
| 5,681,749 A | 10/1997 | Ramamoorthy | |
| 5,684,580 A | 11/1997 | Cooper et al. | |
| 5,699,269 A | 12/1997 | Ashe et al. | |
| 5,699,270 A | 12/1997 | Ashe et al. | |
| 5,712,481 A | 1/1998 | Welch et al. | |
| 5,712,797 A | 1/1998 | Descales et al. | |
| 5,713,401 A | 2/1998 | Weeks | |
| 5,716,055 A | 2/1998 | Wilkinson et al. | |
| 5,717,209 A | 2/1998 | Bigman et al. | |
| 5,740,073 A | 4/1998 | Bages et al. | |
| 5,744,024 A | 4/1998 | Sullivan, III et al. | |
| 5,744,702 A | 4/1998 | Roussis et al. | |
| 5,746,906 A | 5/1998 | McHenry et al. | |
| 5,751,415 A | 5/1998 | Smith et al. | |
| 5,758,514 A | 6/1998 | Genung et al. | |
| 5,763,883 A | 6/1998 | Descales et al. | |
| 5,800,697 A | 9/1998 | Lengemann | |
| 5,817,517 A | 10/1998 | Perry et al. | |
| 5,822,058 A | 10/1998 | Adler-Golden et al. | |
| 5,834,539 A | 11/1998 | Krivohlavek | |
| 5,837,130 A | 11/1998 | Crossland | |
| 5,853,455 A | 12/1998 | Gibson | |
| 5,856,869 A | 1/1999 | Cooper et al. | |
| 5,858,207 A | 1/1999 | Lomas | |
| 5,858,210 A | 1/1999 | Richardson | |
| 5,858,212 A | 1/1999 | Darcy | |
| 5,861,228 A | 1/1999 | Descales et al. | |
| 5,862,060 A | 1/1999 | Murray, Jr. | |
| 5,865,441 A | 2/1999 | Orlowski | |
| 5,883,363 A | 3/1999 | Motoyoshi et al. | |
| 5,885,439 A | 3/1999 | Glover | |
| 5,892,228 A | 4/1999 | Cooper et al. | |
| 5,895,506 A | 4/1999 | Cook et al. | |
| 5,916,433 A | 6/1999 | Tejada et al. | |
| 5,919,354 A | 7/1999 | Bartek | |
| 5,935,415 A | 8/1999 | Haizmann et al. | |
| 5,940,176 A | 8/1999 | Knapp | |
| 5,972,171 A | 10/1999 | Ross et al. | |
| 5,979,491 A | 11/1999 | Gonsior | |
| 5,997,723 A | 12/1999 | Wiehe et al. | |
| 6,015,440 A | 1/2000 | Noureddini | |
| 6,025,305 A | 2/2000 | Aldrich et al. | |
| 6,026,841 A | 2/2000 | Kozik | |
| 6,040,186 A | 3/2000 | Lewis | |
| 6,047,602 A | 4/2000 | Lynnworth | |
| 6,056,005 A | 5/2000 | Piotrowski et al. | |
| 6,062,274 A | 5/2000 | Pettesch | |
| 6,063,263 A | 5/2000 | Palmas | |
| 6,063,265 A | 5/2000 | Chiyoda et al. | |
| 6,070,128 A | 5/2000 | Descales et al. | |
| 6,072,576 A | 6/2000 | McDonald et al. | |
| 6,076,864 A | 6/2000 | Levivier et al. | |
| 6,087,662 A | 7/2000 | Wilt et al. | |
| 6,093,867 A | 7/2000 | Ladwig et al. | |
| 6,099,607 A | 8/2000 | Haslebacher | |
| 6,099,616 A | 8/2000 | Jenne et al. | |
| 6,100,975 A | 8/2000 | Smith et al. | |
| 6,102,655 A | 8/2000 | Kreitmeier | |
| 6,105,441 A | 8/2000 | Conner et al. | |
| 6,107,631 A | 8/2000 | He | |
| 6,117,812 A | 9/2000 | Gao et al. | |
| 6,130,095 A | 10/2000 | Shearer | |
| 6,140,647 A | 10/2000 | Welch et al. | |
| 6,153,091 A | 11/2000 | Sechrist et al. | |
| 6,155,294 A | 12/2000 | Cornford et al. | |
| 6,162,644 A | 12/2000 | Choi et al. | |
| 6,165,350 A | 12/2000 | Lokhandwala et al. | |
| 6,169,218 B1 | 1/2001 | Hearn | |
| 6,171,052 B1 | 1/2001 | Aschenbruck et al. | |
| 6,174,501 B1 | 1/2001 | Noureddini | |
| 6,190,535 B1 | 2/2001 | Kalnes et al. | |
| 6,203,585 B1 | 3/2001 | Majerczak | |

(56) References Cited

U.S. PATENT DOCUMENTS

| | | |
|---|---|---|
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,485,676 B1 * | 11/2002 | Wheeler ............ C04B 35/58007 419/37 |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 | 7/2003 | Williams |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Natzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |

(56) References Cited

U.S. PATENT DOCUMENTS

| | | |
|---|---|---|
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 * | 5/2017 | Formoso ............ B01D 19/0057 |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 9,988,585 B2 | 6/2018 | Hayasaka et al. |
| 10,047,299 B2 | 8/2018 | Rubin-Pitel et al. |
| 10,048,100 B1 | 8/2018 | Workman, Jr. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 12,163,878 B2 | 12/2024 | Bledsoe, Jr. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |

(56) References Cited

U.S. PATENT DOCUMENTS

| | | |
|---|---|---|
| 2006/0091059 A1* | 5/2006 | Barbaro .............. B01D 35/12 210/108 |
| 2006/0162243 A1 | 7/2006 | Wolf |
| 2006/0169064 A1 | 8/2006 | Anschutz et al. |
| 2006/0169305 A1 | 8/2006 | Jansen et al. |
| 2006/0210456 A1 | 9/2006 | Bruggendick |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0103188 A1* | 5/2012 | Stinessen ............ F04D 25/0686 96/195 |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1* | 9/2012 | Ellis .................. B01D 53/1456 95/71 |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0034570 A1* | 2/2015 | Andreussi .......... B01D 17/0214 210/801 |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1* | 6/2016 | Suda .................. B01D 45/08 95/267 |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |

(56) References Cited

U.S. PATENT DOCUMENTS

| | | |
|---|---|---|
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1* | 8/2020 | Sørensen ............ B01D 46/003 |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0182803 A1 | 6/2024 | Woodchick |
| 2024/0189753 A1 | 6/2024 | Esquivel |
| 2024/0294837 A1 | 9/2024 | Larsen |
| 2024/0327723 A1 | 10/2024 | Larsen |
| 2024/0333352 A1 | 10/2024 | Craig |
| 2024/0377287 A1 | 11/2024 | Markins |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |
| CN | 111336612 A | 6/2020 |
| CN | 213762571 U | 7/2021 |
| CN | 213824075 U | 7/2021 |
| CN | 113230697 A | 8/2021 |
| CN | 215263512 U | 12/2021 |
| CN | 215288592 | 12/2021 |
| CN | 113963818 | 1/2022 |
| CN | 114001278 | 2/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |

(56) References Cited

FOREIGN PATENT DOCUMENTS

| | | |
|---|---|---|
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al, Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.

(56) References Cited

OTHER PUBLICATIONS

United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013,.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils-, Part 1: Determination by hot filtration, Second Edition, 2009.
International Standard, ISO 10307-2, Petroleum products—Total sediment in residual fuel oils-, Part 2: Determination using standard procedures for aging, Second Edition, 2009.
Ebner et al., Deactivatin and durability of the catalyst for Hotspot™ natural gas processing, OSTI, 2000, https://www.psti/gov/etdeweb/servlets/purl/20064378, (Year: 2000).
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.

Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
"Development of Model Equations for Predicting Gasoline Blending Properties", Odula et al., American Journal of Chemical Engineering, vol. 3, No. 2-1, 2015, pp. 9-17.
Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
Lloyd's Register, Using technology to trace the carbon intensity of sustainable marine fuels, Feb. 15, 2023.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.

* cited by examiner

METHODS AND SYSTEMS FOR REDUCING CONTAMINANTS IN A FEED STREAM

PRIORITY CLAIM

This application claims priority to and the benefit of U.S. Provisional Application No. 63/470,739, filed Jun. 2, 2023, titled "METHODS AND SYSTEMS FOR REDUCING CONTAMINANTS IN A FEED STREAM," the disclosure of which is incorporated herein.

FIELD OF THE DISCLOSURE

This disclosure relates to refinery systems and methods for foulant removal from fluid streams. One or more embodiments of such systems and methods may enhance compressor run length in a refinery.

BACKGROUND

In the petroleum industry, hydrocarbon refining is the conversion of hydrocarbons into various usable hydrocarbon based products. In the manufacturing of these hydrocarbon based products, a series of processing steps are utilized to transform the hydrocarbons into the desired hydrocarbon based products. Often, one or more of these processing steps involves separating the hydrocarbon into liquid and gaseous components. Once separated, the liquid and gaseous components are then processed to remove impurities and convert the liquid and gaseous components into the desired hydrocarbon based products. These impurities may include physical foulants, such as solids, particulates, or semi-solids, that were originally in the hydrocarbons, along with those that form along the refining processing steps. These impurities or contaminants may be referred to as "foulants," and these foulants may lead to damage in processing equipment or machinery, delays in processing, and altered flow distribution of the product streams.

SUMMARY

Applicant has recognized that processing equipment or machinery such as compressors particularly are vulnerable to fouling issues, and Applicant's disclosure provides embodiments of methods, systems, and controls for filtering foulant involving compressors. In addition, Applicant has recognized that when fluid streams are filtered for foulant (a) prior to reaching or (b) upstream of a compressor, the life-span of the compressor and efficiency of the refinery process may be extended. Further, Applicant has recognized that removing the foulants, or "fouling" of the product streams in refineries may result in significant financial and environmental problems.

Applicant has recognized the problems noted above herein, and the present disclosure is directed to embodiments of methods and systems of reducing the level of foulant in fluid streams prior to reaching a compressor, thereby to increase the life-span of the compressor and the efficiency of the refinery process, for example.

The present disclosure includes embodiments of methods and systems of reducing contaminants in a fluid stream, for example. The contaminants may include one or more type of foulant, as will be understood by those skilled in the art, such as particulate, solids, or corrosive fouling, or combinations thereof. Foulants may include, for example, leftover liquid hydrocarbons which, when deposited on a compressor's blades, leaves a film that attracts particulates (thus, causing buildup), salt from the air or environment surrounding the compressor, dust and/or sand from the environment, and/or other particulates that may be included within the fluid stream. The fluid stream may include one or more products of a refining process, such as various transportation fuels, for example, gasoline, diesel, jet fuel, renewable transportation fuel, butane, propane, other paraffinic and/or olefinic C1-C4 and C5-C6 hydrocarbons, nitrogen, and/or hydrogen, among others. Further, the fluid stream may include an amount of foulants. In an embodiment, a fluid feed stream including foulants may be supplied to a liquid-gas separator, such as a Knockout drum, as will be understood by those skilled in the art, for example. The fluid feed stream may be considered or include the fluid stream provided to a liquid-gas separator. In an embodiment, the fluid feed stream passes though the Knockout drum, and the fluid feed stream is separated into a liquid stream and a gas stream. The gas stream is filtered within the Knockout drum by way of a filtering system, which may include one or more filters, such as a reticulated particle trap, for example. The reticulated particle trap may include one or more of a reticulated macro-porous particle trap, a reticulated micro-porous particle trap, or a reticulated particle trap comprised of a selected material, the selected material ceramic comprising one of a ceramic, plastic (such as polyether, polyurethane, or other plastic material), metal, or other inert materials. In an embodiment, the gas stream exiting the Knockout drum, or outlet stream, may continue along the refinery process, such as to a compressor, for example. The compressor also may include an additional filter to further remove unwanted products of the refining process.

In another embodiment, various properties of the Knockout drum may be monitored for maintenance needs. The properties may include temperature and pressure, for example. Changes of these properties may be indicative of foulant build up within the filtering system, as will be understood by those skilled in the art. In an embodiment, if the properties indicate that maintenance is needed on a first filtering Knockout drum, the fluid feed stream may be redirected to a second filtering Knockout drum of the system. As the fluid feed stream continues to be filtered by the second filtering Knockout drum, maintenance may be performed on the first filtering Knockout drum.

In another embodiment, a filtered gas stream expelled from a filtering Knockout drum may continue downstream to a compressor. The compressor may include a filtering system that filters remaining foulants from the filtered gas stream. The performance and life span of the compressor may be increased due to the upstream filtering and reduced foulant buildup.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure, which are not necessarily drawn to scale, and, therefore, are not to be considered limiting of the disclosure's scope.

DETAILED DESCRIPTION

Figure 1:
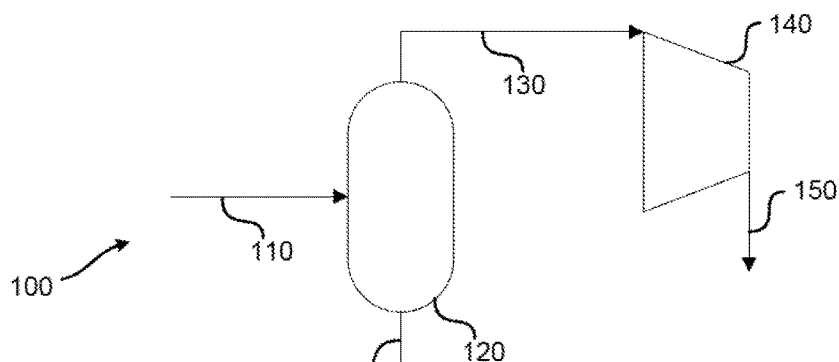
FIG. 1 is a simplified schematic diagram of a filtering system, according to an embodiment of the disclosure.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. However, it is to be noted that the drawings illustrate only various embodiments of the systems and methods disclosed herein and are therefore not to be considered limiting of the scope of the systems and methods disclosed herein as it may include other effective embodiments as well.

Refinery systems (for example, a transportation fuel refinery) often exhibit fouling. For example, such fouling includes buildup of foulant in compressors and pumps over a relatively slow amount of time and results in reduced throughput, increased energy consumption, and more frequent shutdowns. Managing foulant build up usually requires pausing or stopping refinery processes to clean equipment or machinery. Further, if cleaning does not occur, the foulant can result in damage to equipment or machinery. These continuous disruptions result in significant financial, environmental, and other problems.

Generally, a compressor, for example, can include a set of mechanical filters in parallel that collect foulant and prevent it from exiting the compressor. As foulant collects in the compressor filter, maintenance or replacement of the filter may be indicated when the pressure differential of the compressor reaches a set or selected limit (for example, as indicated by one or more pressure sensors positioned throughout the compressor and/or at the outlet of the compressor). If foulant build-up within the filter is uneven and alters the flow of the fluid stream, however, the pressure differential may not be reliable to indicate maintenance. For example, Applicant has recognized that this uneven buildup of solids can lead to a high foulant deposition locally in the filter housing while the pressure differential is still below the set limit. Applicant also has recognized this impact on flow distribution. Further, such a foulant deposition may cause valve leakage in the compressor.

In the present disclosure, embodiments of methods and systems are disclosed that can extend the lifespan of a compressor by intercepting potentially damaging foulants prior to reaching the compressor, without disrupting the overall flow of fluid. Specifically, a method is provided to intercept foulants from a fluid feed stream through a filtering system upstream of a compressor, and a system is provided for uninterrupted refinery processing, even in the presence of foulant build up. The method and system disclosed herein have been found to extend the life span of a compressor. For example, a compressor may be run for about 2 years to about 3 years prior to cleaning, whereas, without such a filtering system, the compressor may be cleaned within weeks of operation to about a half a year. Furthermore, the filtering system provides increased filtering capabilities without substantially interrupting or changing the flow rate of the fluid to the compressor. Such systems may utilize components not utilized for filtering, such as a knockout drum, which is designed to remove liquid from a fluid stream, as liquid may damage a compressor. Thus, removal of the foulants using such systems does not include adding additional and expensive equipment, but rather utilizing existing equipment for an additional and/or different purpose. The fluid stream may include a hydrocarbon based fluid stream. The hydrocarbon based fluid stream may include one or more of, for example, gasoline, diesel, jet fuel, renewable transportation fuel, butane, propane, other paraffinic and/or olefinic C1-C4 and C5-C6 hydrocarbons, nitrogen, and/or hydrogen, among other types of hydrocarbons.

FIG. 1 shows a schematic method flow diagram 100, according to an embodiment of the present disclosure. In this embodiment, for example, a fluid stream 110 containing a foulant is fed via an inlet to a liquid-gas separator, such as a Knockout (KO) drum 120 from an upstream refining process and/or refining equipment via a pipe, piping, or pipeline. As will be understood by those skilled in the art, the KO drum 120 separates gas from entrained and condensed liquids or liquid droplets. The KO drum 120 can be a two-phase separator, separating gas from liquid, or a three-phase separator, separating gas, water, and oil, for example. Those skilled in the art will understand that the KO drum also can be referred to as a flash drum, a knockout pot, a KO drum, a knock-out vessel, a flare KO drum, a mist eliminator, a scrubber separator, a vane pack separator, a demister pad separator, an inertial separator, a mesh pad separator, a droplet separator, a gas liquid separator, a vapor liquid separator, a cyclone separator, or a chevron mist eliminator.

Inside the Knockout drum 120, the fluid stream 110 is separated into a liquid and a gas, each of which is expelled to form a liquid stream (for example, output at a as a liquid outlet stream 160) and a gas stream. A filtering system within the Knockout drum 120 captures or entraps foulant as the fluid stream 110 flows through the filtering system. The filtering system may be positioned within the Knockout drum 120 to filter the gas, liquid, or a combination thereof. The filtering system removes foulant through one or more or more filtering devices, such as a filter (for example, a reticulated particle trap and/or other types of filters). After filtering, the fluid stream, in particular the separated gas stream (which, for example, may be free or substantially free from liquid or include less liquid than when the fluid stream entered the KO drum 120) exits the KO drum 120 as an outlet stream 130, where it continues downstream to a compressor 140. Further, separated liquid may exit the KO drum 120 as a second outlet stream 160.

As noted one or more filters positioned within the KO drum 120 may capture or entrap foulants from the fluid stream 110. The one or more filters may be reticulated and/or include pores that are sized in such a way to allow fluid to flow through the pores while simultaneously preventing foulant from passing through the pores. The pores may be sized to capture or entrap various types of foulants; for example, the pores may be larger in size to capture or entrap larger foulants, the pores may be smaller in size to capture or entrap smaller foulants, or a combination thereof. The pore sizing may additionally vary based on the type of fluid flowing through the pore, for example, a liquid or a gas. The distribution of pores, regardless of size, may be homogenous, heterogenous, or a combination thereof. A heterogenous distribution of pores may form a gradient within the KO drum 120, with the pores gradually increasing or decreasing in size. Gradients may be formed in the direction of the inlet to the outlet and/or from the outer edge of the filter to the middle of the filter. In another example, filters with differing pore sizes may be randomly distributed throughout the KO drum 120. The pore sizing and distribution, as well as the type of fluid to be filtered, may impact or influence the flow rate of the fluid stream, as will be understood by those skilled in the art. Further, each filter may be positioned within the KO drum 120 such that gaps of varying sizes are present between each of the filters. The gaps between each filter may allow for fluid to flow therethrough, preventing substantial impact on flow rate.

The filtering system may include one or more filters with pores distributed homogenously. For example, for a filtering system with more than one filter, each filter may have pores sized to capture or entrap the same type of foulant(s) and distributed in the same or similar manner. For homogenous pore distribution, a similar distribution is a homogenous distribution regardless of the pore size. For example, in a filtering system with one or more filters, the filter may have pores with a variety of sizes to capture or entrap a variety of foulants. In a filtering system with more than one filter, for example, each filter may have pores sized to capture or entrap the same or similar type of foulant(s) and distributed in the same or similar manner. In another example, for a filtering system with more than one filter, a first filter may have pores sized to capture a smaller foulant, and a second filter may have pores sized to capture a larger foulant.

The filtering system may include one or more filters with pores distributed heterogeneously. For example, for a filtering system with more than one filter, each filter may have pores sized to capture or entrap varying types of foulant(s) and distributed in a gradual or random manner. For heterogenous pore distribution, pores have a distinguishable distribution regardless of the pore size. Additionally, a distribution may be considered heterogenous if the pores were distributed as a gradient within the KO drum 120, with the pore sizes and/or the number of pores gradually increasing or decreasing, or randomly distributed throughout the KO drum 120. For example, for a filtering system with one or more filters, the filter may have pores sized to capture or entrap a variety of foulants but have a gradient or random distribution within the KO drum 120. In another example, for a filtering system with more than one filter, a first filter may have pores sized to capture or entrap a smaller foulant, a second filter may have pores sized to capture or entrap a larger foulant, and/or subsequent filters may be sized larger than previous filters. Both these filters would have a heterogenous distribution if the pore sizes and/or number of pores gradually increased or decreased, regardless of direction of the gradient.

These filtering systems have been found to remove a significant amount of foulant within a fluid, thus preventing the foulant from reaching a compressor. For example, a filtering system as presently disclosed may remove substantial amounts or substantially all of the targeted foulants from a fluid. "Substantial amounts" as used herein indicates at least 75%. "Substantially all" as used herein indicates at least 90%. In some embodiments, filters may be configured to capture or entrap substantial amounts or substantially all foulants of a given type or size. In other words, the filters may capture or entrap minimal amounts (less than 25%) of certain foulants, while capturing substantial amounts or substantially all of other foulants. Accordingly, foulant in a fluid may pass through one or more filters prior to being captured in the filtering system. Additionally, in some embodiments, some types of foulants are intentionally not filtered from fluid and, instead, are further processed and/or filtered downstream of the filtering system.

The filter disclosed herein, for example, may include or be comprised of one or more materials capable of withstanding the internal conditions of the Knockout drum, such as high temperature and/or high pressure conditions, in addition to exposure to potentially corrosive fluid and/or prolonged exposure to water or other non-corrosive fluids. For example, the filter may be ceramic-based material, plastic-based material, metal-based material, or a combination thereof. The material may be an inert material. In some embodiments, the filter used may include a CatTrap® or a TopTrap® filter product.

Figure 7:
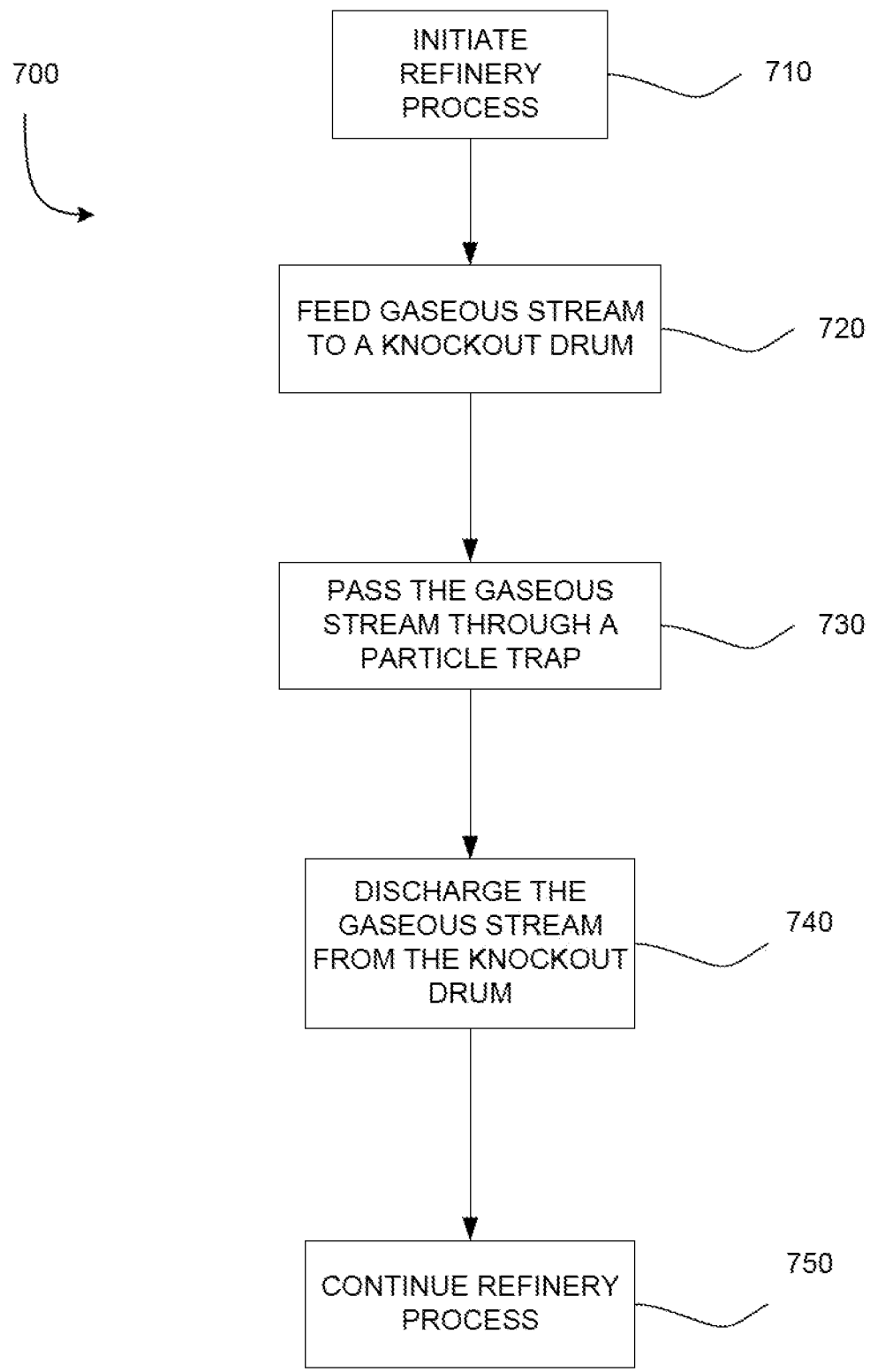
FIG. 7 is a flowchart depicting an overview of an embodiment of the disclosure.
Figure 8:
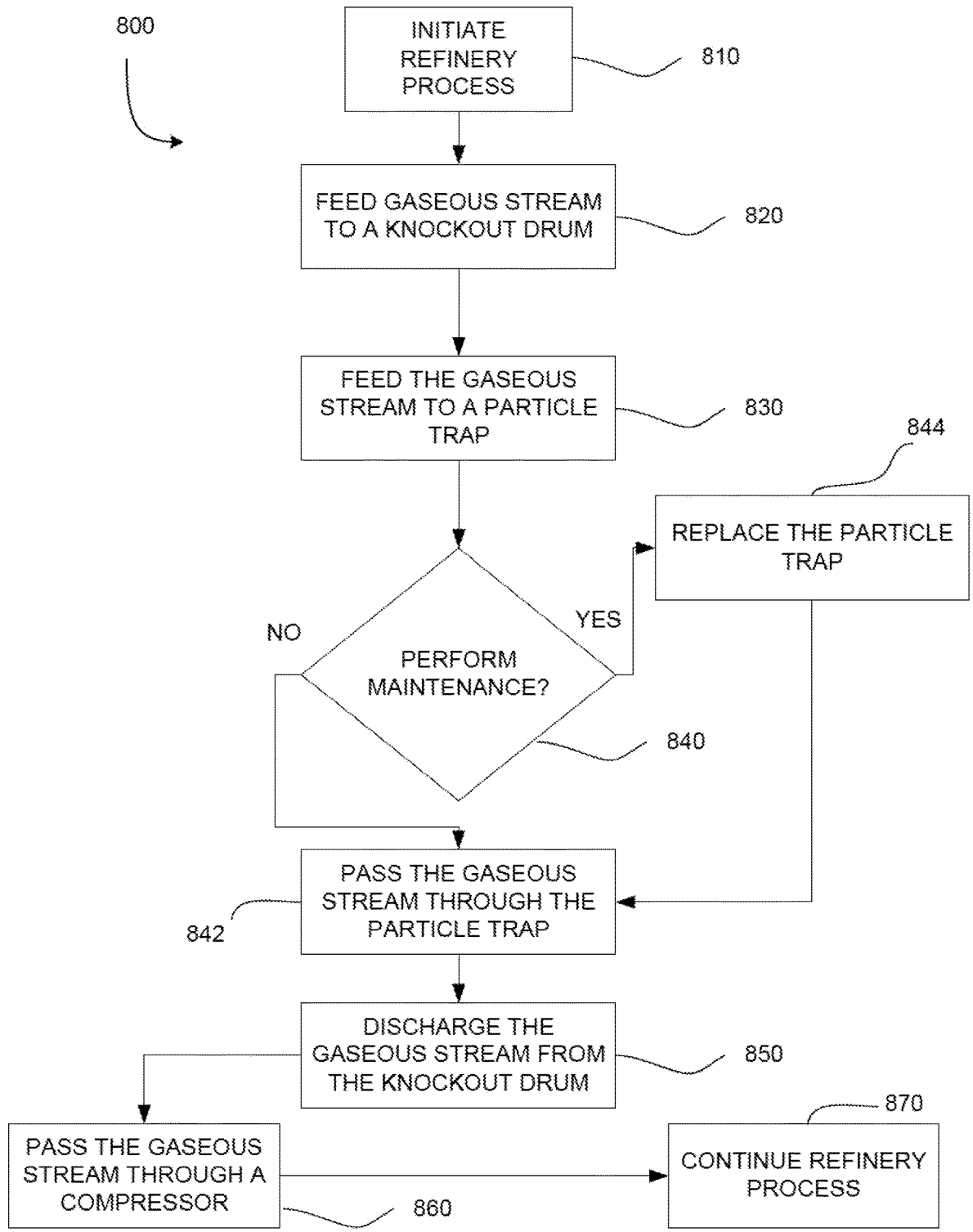
FIG. 8 is a flowchart depicting an overview of an embodiment of the disclosure.

In an embodiment, the one or more filters may capture or entrap a selected amount of foulants. After the selected amount of foulants are captured, the one or more filters may be cleaned before the one or more filters are able to capture or entrap additional foulants. Further, as noted above, the one or more filters may affect the flow of fluid to a degree. Once a filter has captured the selected amount of foulants, flow through that filter may be impeded further. Thus, to ensure that flow of fluid through the KO drum 120 is not impeded, the one or more filters may be cleaned. To clean the one or more filters, a user may remove the filters and manually clean them (for example, by washing the filters with water and, in addition to water, in some embodiments, solvents and/or detergents). In another embodiment, a controller (as illustrated in FIGS. 7 and 8) may initiate a cleaning process. In such an embodiment, the controller may cause one or more valves to open and cause water (in addition to, in some embodiments, solvents and/or detergents) to be pumped to and through the KO drum 120, thus cleaning the one or more filters.

In another embodiment, the KO drum 120 may be partially filled with or completely filled with the filters. In an embodiment, a tray may be positioned within the KO drum 120. The tray may hold a selected amount of filters. The tray may be positioned such that gas and/or other fluid flows through the filters prior to exiting the KO drum 120.

Figure 2:
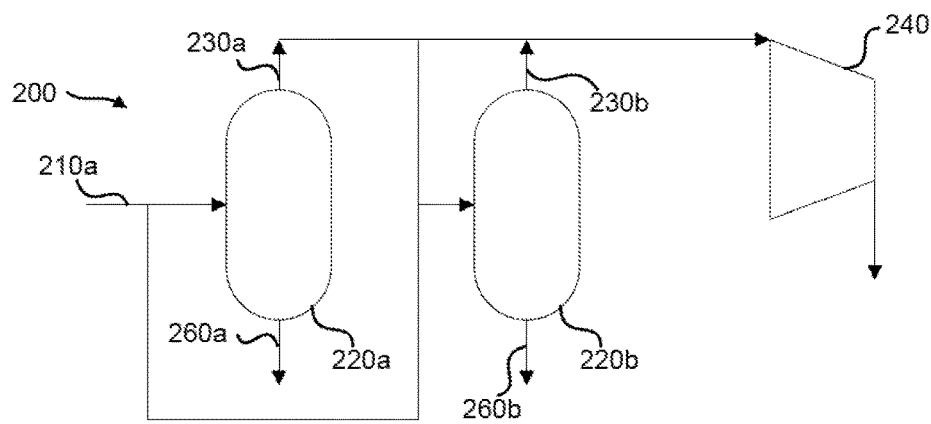
FIG. 2 is another simplified schematic diagram of a filtering system, according to and embodiment of the disclosure.

FIG. 2 shows a simplified schematic diagram, according to an embodiment of the present disclosure. As illustrated, a system may include a first and second KO drums 220a, 220b, and a compressor 240. A fluid stream 210a may flow to the first KO drum 220a via a pipe, piping, or pipeline. In this embodiment, the first Knockout drum 220a may separate the fluid stream 210a into a liquid and a gas, each of which is expelled to form a gas stream and a liquid stream. The liquid stream may be expelled or transferred from the first KO drum 220a via a pipe, piping, or pipeline 260a. The gas stream may flow via pipeline 230a to the compressor 240 or to the second KO drum 220b. A filtering system, sub-system, device, or apparatus (hereinafter referred to as a sub-system) may be positioned within the KO drum 220a and/or the KO drum 220b, and may be configured to remove foulants from the fluid stream 210a. The filtering sub-system may remove foulants from the gas, liquid, or a combination thereof. Based on the configuration, the filtering sub-system may be positioned towards the top of the first KO drum 220a and/or second KO drum 220b, towards the bottom of the first KO drum 220a and/or second KO drum 220b, in the middle of the first KO drum 220a and/or second KO drum 220b, or a combination thereof. Further, the filtering sub-system may fill or partially fill the first KO drum 220a and/or second KO drum 220b. The filtering sub-system may also be positioned at the inlet of the first KO drum 220a, at the gas stream outlet (for example, proximate the connection between the first KO drum 220a and pipeline 230a), at the liquid stream outlet (for example, proximate the connection between the first KO drum 220a and pipeline 260a), at the inlet of the second KO drum 220b, at the gas stream outlet (for example, proximate the connection between the second KO drum 220b and pipeline 230b), at the liquid stream outlet (proximate the connection between the second KO drum 220b and pipeline 260b), or a combination thereof. A Knockout drum may include additional or alternative inlet and/or outlets, and the filtering sub-system may be positioned at any of these as well. The filtering sub-system may include one or more filters.

In an embodiment, the fluid stream 210a, as noted may flow to a KO drum (for example, the first KO drum 220a or the second KO drum 220b). In an embodiment, one of the first and second KO drums 220a and 220b may be active at a time, while the other may serve as a backup. In such embodiments, the fluid stream 210a and the gas output from the first KO drum 220a may bypass the second KO drum 220b. In such embodiments, during cleaning of the filtering sub-system in the first KO drum 220a, the second KO drum 220b may be active and the first KO drum 220a becomes the backup (for example, during and after cleaning). The outlet stream may then continue downstream in the refinery process to a compressor 240. In another embodiment, the fluid stream 210a may flow through both the first and second KO drum 220a and 220b in a sequential order. In such an embodiment, the first and second KO drum 220a and 220b may each contain the same or different filtering sub-system. For example, the first KO drum 220a may include a filtering sub-system with a larger pore size, while the second KO drum 220b may include a filtering sub-system with a smaller pore size.

Figure 3:
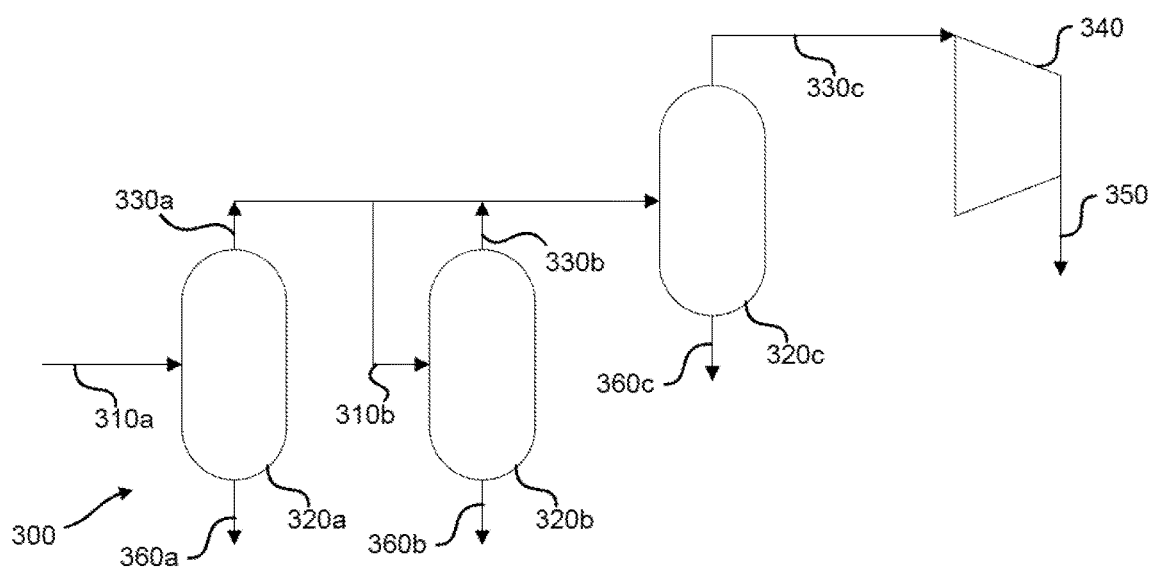
FIG. 3 is another simplified schematic diagram of a filtering system, according to an embodiment of the disclosure.

FIG. 3 shows a simplified schematic diagram, according to another embodiment of the present disclosure. In this embodiment, for example, a KO drum 320a separates the fluid stream 310a into a gas and a liquid, each of which is expelled to form a gas stream. Within the KO drum 320a is a filtering system that is configured to remove foulants from the gas and the liquid. The filtering system includes one or more filters. The filtering system may remove foulants from the gas, liquid, or a combination thereof. Based on the configuration, the filtering system may be positioned towards the top of the KO drum, towards the bottom of the knockout drum, in the middle of the KO drum, or a combination thereof. The filtering system may also be positioned at the inlet of the KO drum 320a, at the gas stream outlet 330b, at the liquid stream outlet, or a combination thereof. A KO drum may include additional or alternative inlet and/or outlets, and a person of ordinary skill in the art will understand and recognize that a filtering system may be positioned at any of these as well. The filtering system may include one or more filters.

In this embodiment, the system has an additional or second KO drum 320b, which may have a filtering system configured the same as KO drum 320a. The presence of the second KO drum 320b allows the inlet stream to bypass KO drum 320a, and instead be processed by KO drum 320b. The additional KO drum 320b may allow the system 300 to continue when or if KO drum 320a is unable to process the inlet stream (e.g., maintenance). Once the inlet stream 310a is processed, it exits the KO drum to form an outlet stream 330b. In this embodiment, the outlet stream 330b may be further processed in KO drum 320c. KO drum 320c may have a filtering system as disclosed herein, although, in some embodiments, the KO drum 320c is configured to alter the outlet stream 330b in a different means or by a different means. For example, the KO drum 320c may be configured to further remove moisture from a the outlet stream 330b. In another embodiment, the KO drum 320c may include a filtering system as well and may further filter the outlet stream 330b, as well as remove moisture from the outlet stream 330b. The outlet stream 330c of KO drum 320c then continues downstream to a compressor 340.

Figure 4A:
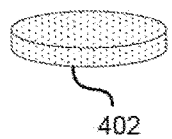
FIG. 4A, FIG. 4B, FIG. 4C, FIG. 4D, FIG. 4E, and FIG. 4F are schematic diagrams of types of filters and knockout drums with varying amounts of filters, according to an embodiment of the disclosure.
Figure 4B:
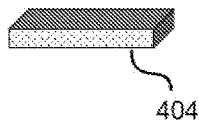

FIGS. 4A and 4B illustrate examples of reticulated particle traps. Particle trap 402 may comprise a disk or circular shape. The particle trap 402 may include pores of a selected size. In another embodiment, the pores may each be random sizes. In yet another embodiment, the particle trap 402 may be comprised of a ceramic material, a plastic material (for example, polyether, polyurethane, or other plastic material), a metal material, or other inert material. The diameter of the particle trap 402 may be about 0.5 inches to about 10 inches. The thickness of the particle trap 402 may be about 0.5 inches to about 1.5 inches. In another embodiment, the particle trap 404 may be shaped similar to a rectangle or square. As noted, the particle traps 402, 404 may capture, entrap, and/or attract foulants. As the particle traps 402, 404 capture, entrap, and/or attracts foulants, the particle traps 402, 404 may become saturated or unable to further capture, entrap, and/or attracts foulants. The particle traps 402, 404 may be washed with water (and, for example, in addition to water, detergents or solvents).

Figure 4C:
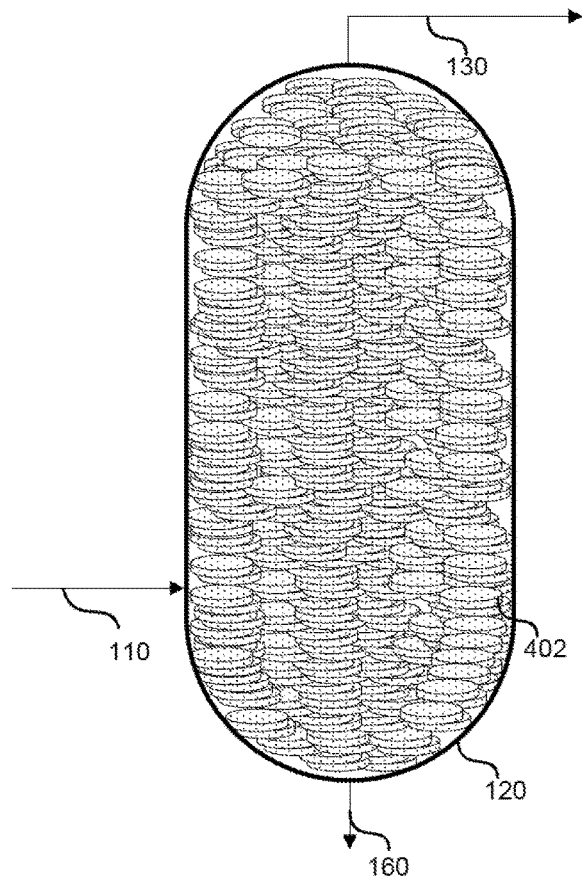
Figure 4D:
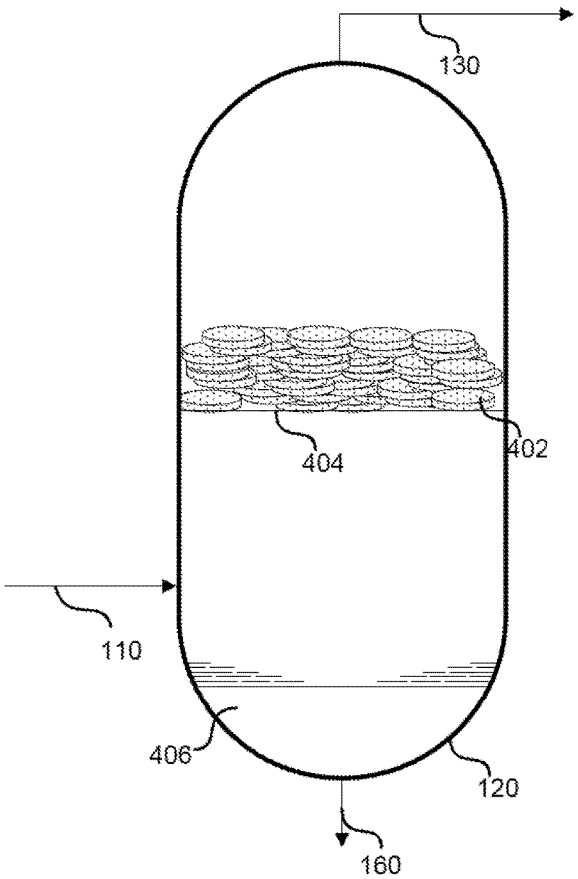
Figure 4E:
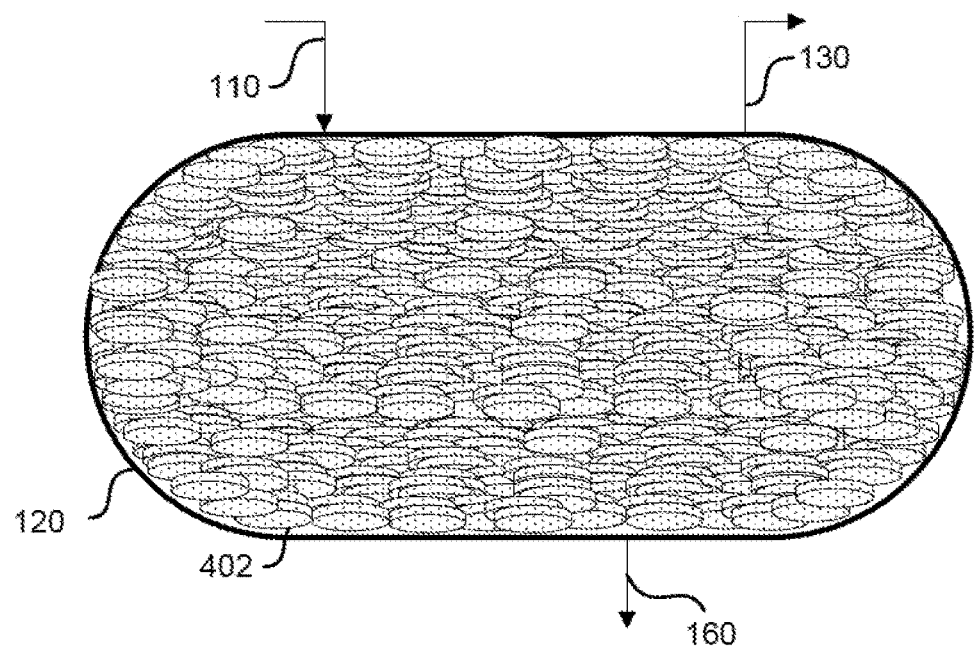
Figure 4F:
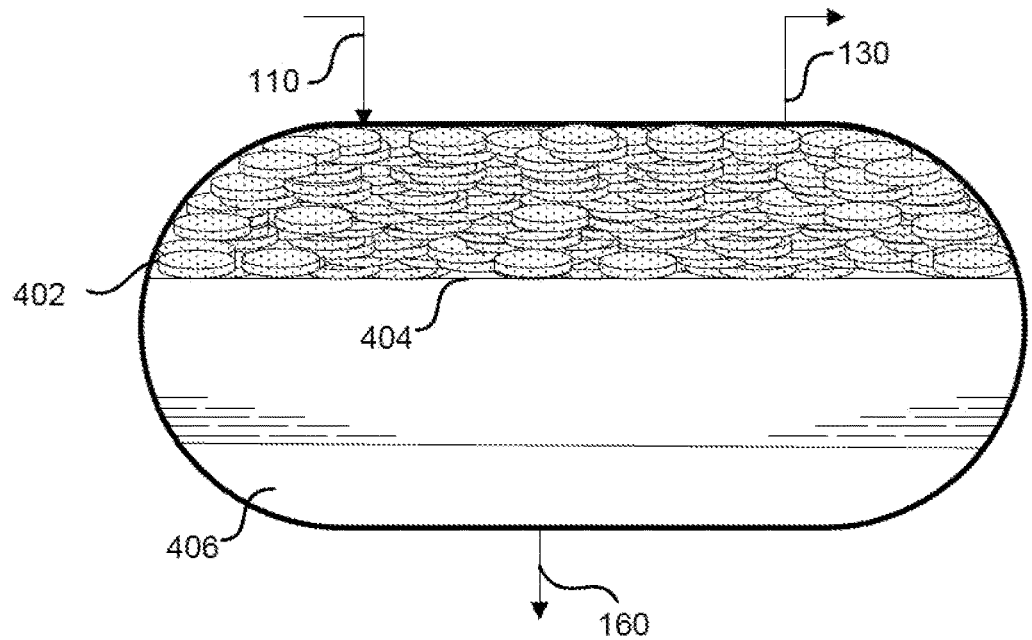

Turning to FIG. 4C, a KO drum 120 may include a filtering sub-system. In such examples, the filtering sub-system may include a plurality of particle traps 402 (and/or particle traps 404). For example, the KO drum 120 may be filled with the plurality of particle traps 402. As the KO drum 120 may include other components (for example, to remove entrained liquid 406 in a gaseous stream), the particle traps 402 may be positioned to fill in the remaining space within the KO drum 120. The KO drum 120 may, while retaining the ability to remove liquid from the gaseous stream, be able to filter foulants from the gaseous stream entering the KO drum 120. In another embodiment, as illustrated in FIG. 4D, the KO drum 120 may include a tray 404. In such embodiments, a portion of the KO drum 120 may be partially filled with particle traps 402, such as stacked on the tray 404. As shown in FIGS. 4C and 4D, the KO drum may be positioned vertically. In another embodiment, as illustrated in FIGS. 4E and 4F, the KO drum 120 may be horizontally positioned.

Figure 5:
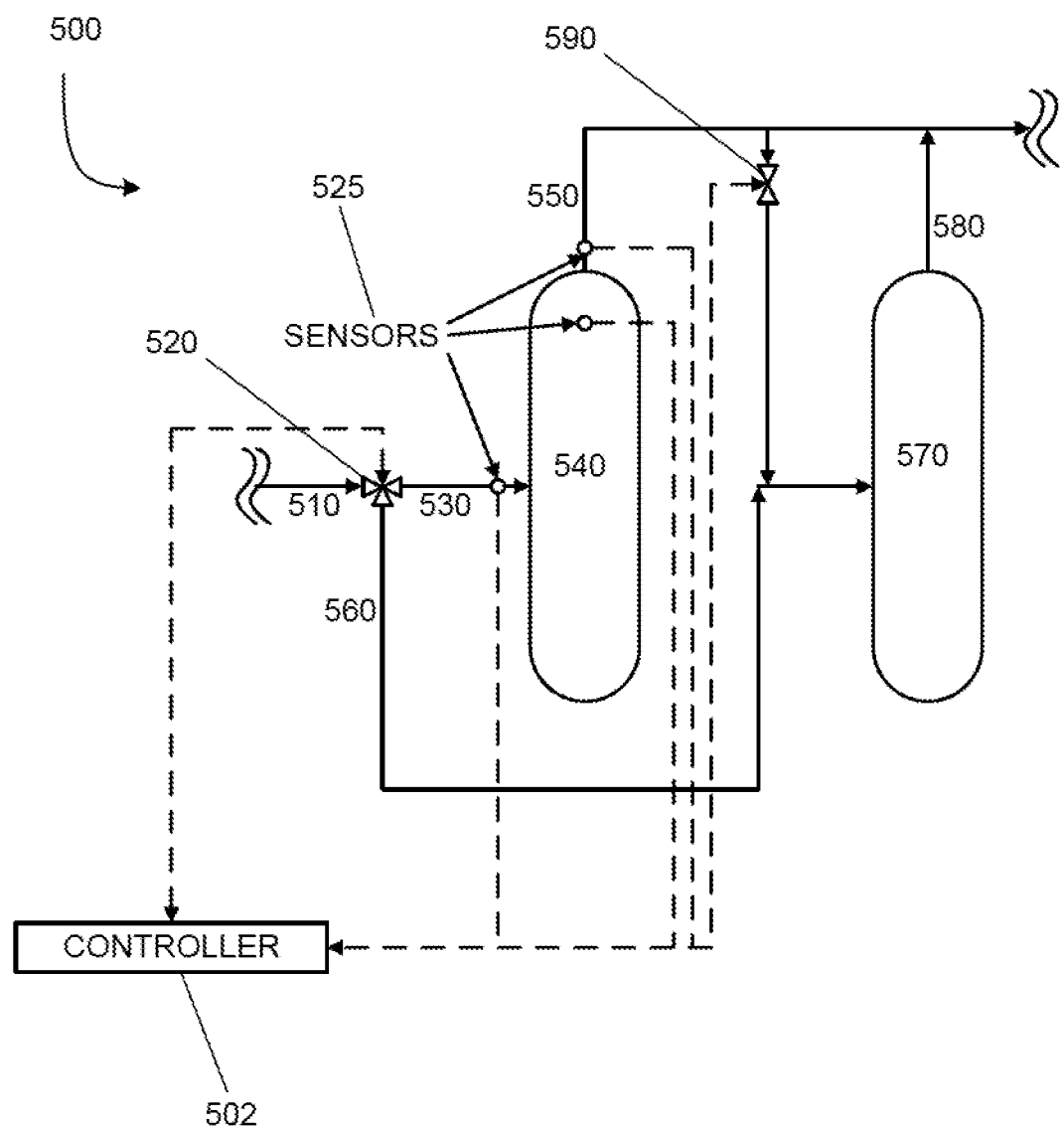
FIG. 5 is another simplified schematic diagram of a filtering system, according to an embodiment of the disclosure.

FIG. 5 illustrates a simplified schematic diagram, according to an embodiment of the present disclosure. In this embodiment, for example, a refinery process can continue despite foulant build up and/or a compressor may operate longer than typical, as foulant buildup may not occur or occur at a slower rate than typical (for example, due to the filtering of foulants). In such an embodiment, a refinery 500 may include one or more control systems disclosed herein and one or more KO drums 540, 570 with filtering systems, as described herein. For example, a controller 502 may be in communication or signal communication with one or more flow control devices 520, 590 and one or more sensors 525. The one or more sensors 525 may be positioned throughout the refinery 500 and configured to monitor the conditions of the one or more KO drums 540, 570 with a filtering system and/or of pipeline positioned proximate the KO drums 540, 570 and the fluid therein. The flow control devices 520, 590 may direct the fluid away from or to the one or more KO drums 540, 570 based on the conditions of the one or more KO drums 540, 570 and/or of pipeline positioned proximate the KO drums 540, 570.

In this embodiment, for example, a refinery 500 includes a first Knockout drum 540 with a first filtering system and a second Knockout drum 570 with a second filtering system. A fluid feed stream 510 enters a flow control device 560 that is in signal communication with the controller 502. The controller 502 directs the fluid feed stream 510 to define a first fluid input stream, for example. In this example, the first fluid input stream 530 enters the first Knockout drum 540, where the first fluid input stream 530 is separated into a residual liquid and a gas. Foulants from at least the gas are removed as the gas pass through the first filtering system. The residual liquid and gas are expelled from the first Knockout drum 540 as a first residual liquid stream and a first gas outlet stream. One or more sensors is positioned to monitor the conditions of the first Knockout drum 640, for example, a sensor 525 may be positioned at the inlet of the first Knockout drum 540, within the first Knockout drum 540, and/or at the outlet of the first Knockout drum 540. The sensor 525, for example, is configured to transmit data to the controller 502, such as flow rate or pressure of a fluid, for example. This data is indicative of the conditions within the refinery 500, for example, the first filtering system within the first Knockout drum 540. In a specific example, the data may show an increase in pressure at the inlet of the first Knockout drum 540, which may indicate that the first filtering system has filled with foulant and that the first Knockout drum 540 requires maintenance. If the data does not indicate that the first Knockout drum 540 requires maintenance, the first gas outlet stream 550 enters a flow control device 590 that defines a second gas outlet stream, for example, 580. The second gas outlet stream 580 continues downstream to a compressor. The compressor may filter the second gas output stream 580 to remove remaining foulants.

Alternatively, if the data does indicate that the first Knockout drum 540 requires maintenance, the controller 502 directs the flow control device 560 to re-route the fluid feed stream 560 and defines a second fluid input stream. The second fluid input stream enters a flow control device 590 that directs the second fluid input stream to define a third fluid input stream, for example. The third fluid input stream enters the second Knockout drum 570, where the third fluid input stream is separated into a residual liquid and a gas. Foulants from at least the gas are removed as the gas pass through the second filtering system. The residual liquid and gas are expelled from the second Knockout drum 570 as a second residual liquid stream and a third gas outlet stream. One or more sensors 525 is positioned to monitor the conditions of the second Knockout drum 570, for example, a sensor may be positioned at the inlet of the second Knockout drum 570, within the second Knockout drum 570, and/or at the outlet of the second Knockout drum 570. The sensor 670, for example, is configured to transmit data to the controller, such as flow rate or pressure of a fluid, for example. This data is indicative of the conditions within the refinery 500, such as the first filtering system within the first Knockout drum 540. In a specific example, the data may indicate or show an increase in pressure at the inlet of the second Knockout drum 570, which may indicate that the second filtering system has filled with foulant and that the first Knockout drum 540 requires maintenance. If the data does not indicate that the second Knockout drum 570 requires maintenance, the third gas outlet stream continues downstream to a compressor. The compressor may filter the third gas outlet stream to remove remaining foulants.

After the controller 502 redirects the fluid flow stream from the first Knockout drum 540 to the second Knockout drum 570, maintenance can be performed on the first Knockout drum 540 without pausing the refinery process. The controller 502 may also direct a filter control device to correct the maintenance issue. In some embodiments, the correction may be a notification or alarm indicating a filtering system issue, for a person working in the refinery to fix. In some embodiments, the correction may be to fix the issue with the filtering system itself. For example, the controller may identify that the filtering system has, or likely has, a clogged filter. The controller may then direct the filter control device to replace the filter with another filter, clean the filter, or perform the needed maintenance.

After maintenance is completed, the controller may redirect the fluid flow stream 510 from the second Knockout drum 570 to the first Knockout drum 540 if the data from the one or more sensors 525 indicates that the second Knockout drum 570 requires maintenance.

Figure 6:
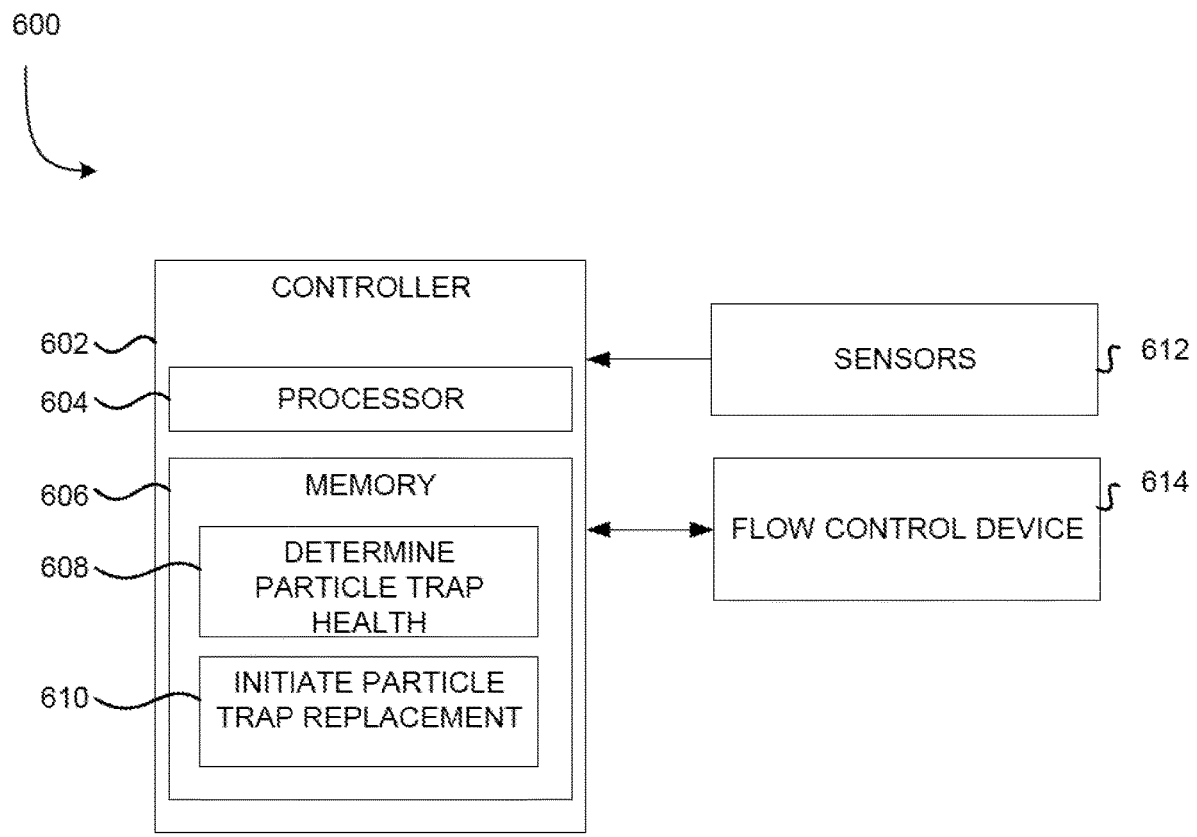
FIG. 6 is a simplified diagram illustrating a control system for filtering foulants, according to an embodiment of the disclosure.

FIG. 6 illustrates a control system for managing a filtering system. The controller 602 may include a machine-readable storage medium, or memory 606, and one or more processors 604. As used herein, a "machine-readable storage medium" may be any electronic, magnetic, optical, or other physical storage apparatus to contain or store information such as executable instructions, data, and the like, as will be understood by those skilled in the art. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory 606 may store or include instructions executable by the processor 604. As used herein, a "processor" may include, for example one processor or multiple processors included in a single device or distributed across multiple computing devices. The processor 604 may be one or more of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof, as will be understood by those skilled in the art.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

In an embodiment, the controller 602 include instructions 608 to determine a particle trap health. Upon execution of instructions 608, the controller 602 may obtain the conditions at various points and/or locations or of materials in the refinery system. Sensors 612 or probes may provide, in real-time and/or continuously or at regular intervals, a signal to the controller 602 indicative of the conditions within the Knockout drum and/or indicative of the condition of the materials within or exiting the Knockout drum.

Other sensors 612 may be disposed throughout the system 600 to measure or indicate various other aspects or characteristic within the system, as will be understood by those skilled in the art. For example, the sensors positioned and/or disposed throughout the system 600 may be pressure transducers, flow meters, mass flow meters, Coriolis meters, other measurement sensors to determine a density, flow, temperature, or other variable as will be understood by those skilled in the art, or some combination thereof. As noted above, the controller 602 may be in signal communication with the sensors 612. The controller 602 may poll or request data from the sensors 612 at various points or substantially continuously during the refinery process.

The system 600 may include one or more different flow control devices 614. The flow control devices 614 may include a gaseous stream flow control device, a liquid flow control device, and/or other flow control devices to control an amount of material or fluid flowing from one location to another. Each flow control device 614 may include one or more of a pump, a meter (as described herein), a sensor or probe (as described herein), a valve (e.g., a control valve, a slide valve, or another valve configured to control an amount of fluid or material flowing therethrough), and/or some combination thereof. In such examples, each component of the flow control device 614 may be in signal communication with the controller 602. The flow control devices 614 may allow for adjustment of the flow of the fluid or material based on various factors received by the controller 602. In an embodiment, the flow control devices 614 may redirect a fluid stream from one KO drum to another (for example, based on KO drum maintenance schedules or events and/or based on a determination by the controller 602 that the KO drum maintenance may occur).

The system 600 may include one or more different filter control devices, as understood by those skilled in the art. For example, the system 600 may include filtering systems to filter fluid flowing through the refinery process. The filtering systems (or, in particular, a sensor, flow control device, or subcontroller of the filtering system) may be in signal communication with the controller 602. The controller 602 may in signal communication with a filter control device 614. In such examples, the filter control device 614 may allow for replacement and control of filters within the filtering system.

The controller 602 may receive and send information, data, and/or instructions to and from, respectively, the various sensors or probes 612, flow control devices 614, and/or filter control devices. In such examples, the controller 602 may receive some characteristic regarding one or more different parts of the system 600 including the sensors or probes (e.g., temperature and/or pressure within a Knockout drum) and, based on those characteristics and one or more preselected thresholds (e.g., a preselected temperature range and/or pressure range within the Knockout drum), adjust flow and/or amount of one or more materials or fluids flowing into or supplied to the Knockout drum. When characteristics indicate that a filter need maintenance, the controller 502 may fix or replace the filter.

In an embodiment, the memory 606 may include instructions 610 to determine and/or initiate replacement and/or cleaning of a particle trap positioned in the KO drum. Instructions 610, when executed, may obtain data related to one or more particle traps, the location of the particle traps, and/or based on other factors. In such embodiments, the instructions 610, when executed, may cause the controller 602 to obtain data from one or more sensors positioned on, in, and/or proximate one or more KO drums. Once the controller 602 has obtained the data, the controller 602 may initiate cleaning or replacement of particle trap positioned within one of the KO drums. For example, if the pressure within a KO drum is higher than typical, then the controller 602 may indicate or may initiate a cleaning process. The controller 602 may also consider flow rate from a KO drum, temperature within or proximate the KO drum, and/or time since a previous cleaning or replacement. Initiation of a cleaning process may include transmitting a prompt to a user and/or pumping water through the KO drum until the particle traps are clean.

FIG. 7 illustrates an flow diagram of a method of an embodiment of the present disclosure. At block 710, the method begins with initiating a refinery process, such as refining one or more hydrocarbons. The refinery process may include compressing one or more gasses. As such, to perform such a compression step, at block 720, a gaseous stream including foulants may be fed to a KO drum. The KO drum may include a plurality of reticulated particle traps (or other types of filters). Further, the KO drum may separate liquids from the gaseous stream, as the gaseous stream passes through the KO drum. At block 730, as the gaseous stream passes through the KO drum, the gaseous stream may flow through and around the plurality of reticulated particle traps. As the gaseous stream flows through the plurality of reticulated particle traps, each of the reticulated particle traps may capture or entrap foulants within the gaseous streams (in other words, the reticulated particle traps may filter the gaseous stream). At block 740, the filtered gas stream is then expelled from the Knockout drum and, at block 750, continues along the refinery process (for example, to a compressor for compression).

FIG. 8 is a flow diagram, implemented in a controller, for managing a filtering of a fluid stream prior to a compressor, according to an embodiment of the disclosure. The method 800 is detailed with reference to the controller 602 of FIG. 6. Unless otherwise specified, the actions of method 800 may be completed within the controller 602. Specifically, method 800 may be included in one or more programs, protocols, or instructions loaded into the memory of the controller 602 and executed on the processor or one or more processors of the controller 602. The order in which the operations are described is not intended to be construed as a limitation, and any number of the described blocks may be combined in any order and/or in parallel to implement the methods.

At block 810, the controller 602 may initiate a refinery process, such as refining one or more hydrocarbons. The refinery process may include, as part of a sub-process, compressing one or more gasses. As such, to perform such a compression step, at block 820, a gaseous stream, including foulants, may be fed to a KO drum. The KO drum may include a plurality of reticulated particle traps (or other types of filters). Further, the KO drum may separate liquids from the gaseous stream, as the gaseous stream passes through the KO drum. At block 830, as the gaseous stream passes through the KO drum, the gaseous stream may flow through and around the plurality of reticulated particle traps. As the gaseous stream flows through the plurality of reticulated particle traps, each of the reticulated particle traps may capture or entrap foulants within the gaseous streams (in other words, the reticulated particle traps may filter the gaseous stream).

As foulants are captured, over time the reticulated particle trap may become saturated or unable to capture or entrap additional foulants. The controller 602, at block 840, may determine whether the reticulated particle traps are to be maintained (for example, cleaned or replaced). The controller 602 may determine that the reticulated particle traps are to be maintained based on one or more of flow rate from the KO drum (as determined by the controller 602 based on data from one or more sensors or flow meters positioned proximate a KO drum), pressure within the KO drum (as determined by the controller 602 based on data from one or more sensors or pressure transducers positioned proximate and/or within a KO drum), temperature of a fluid stream and/or within the KO drum (as determined by the controller 602 based on data from one or more sensors positioned proximate and/or within a KO drum), and/or based on a time since the last cleaning and/or replacement of the reticulated particle trap, among other factors. In another embodiment, the controller 302 may determine whether to perform maintenance by monitoring the pressure of the fluid expelled from the KO drum and comparing that pressure to a selected threshold or selected pressure threshold.

If the controller 602 determines that the reticulated particle trap is to be cleaned or replaced, the controller, at block 844, may initiate such a cleaning or replacement. In an embodiment, the controller 602 may prompt a user to perform such management. In another embodiment, the controller 602 may direct water, as well as, in some embodiments, solvents and/or detergents, to the KO drum via one or more pipelines. The water (and, in some embodiments, the solvents and/or detergents) may flow through the KO drum, thus cleaning the reticulated particle traps.

At block 842, if the controller 602 determines that the reticulated particle trap is not to be cleaned or if the reticulated particle trap has been cleaned, then the controller 602 may direct, via one or more flow control devices, the gaseous stream through the KO drum and, thus, through the reticulated particle trap. At block 850, the filtered gas stream is then expelled from the Knockout drum and, at block 860, passed through a compressor for compression. At block 870, the controller 602 may continue the refinery process. Thus, the method 800 may enable a reduced compressor maintenance time, as less or no foulants may reach the compressor.

Specific compositions, methods, or systems are intended to be only illustrative of the embodiments disclosed by this specification. Variation on these systems, methods, or embodiments are readily apparent to a person of skill in the art based upon the teachings of this specification and are therefore intended to be included as part of the inventions disclosed herein.

This application claims priority to and the benefit of U.S. Provisional Application No. 63/470,739, filed Jun. 2, 2023, titled "METHODS AND SYSTEMS FOR REDUCING CONTAMINANTS IN A FEED STREAM," the disclosure of which is incorporated herein.

The above detailed description is given for explanatory or illustrative purposes. It will be apparent to those skilled in the art that numerous changes and modifications can be made without departing from the scope of the inventive aspects of the technology. Accordingly, the whole of the foregoing description is to be construed in an illustrative and not a limitative sense, the scope of the invention being defined solely by the appended claims.

The invention claimed is:

1. A method for reducing contaminants in a hydrocarbon based fluid stream in a transportation fuel refinery, the method comprising:
    feeding the hydrocarbon based fluid stream into a first Knockout drum positioned in the transportation fuel refinery, the hydrocarbon based fluid stream including foulant;
    separating the hydrocarbon based fluid stream into a gas and a liquid in the first Knockout drum;
    passing the gas through one or more filters including a plurality of pores of one or more reticulated particle traps positioned within the first Knockout drum to entrap the foulant in the one or more filters when the gas passes therethrough; and
    expelling the gas from the first Knockout drum to form a filtered hydrocarbon based gas stream;
    directing the filtered hydrocarbon based gas stream to a compressor for compression, the filtered hydrocarbon based fluid stream including reduced foulant to extend the compressor's maintenance time;
    monitoring a pressure of the gas expelled from the first Knockout drum; and
    maintaining a second Knockout drum as a backup to the first Knockout drum while the pressure of the gas expelled from the first Knockout drum is within a selected threshold, wherein a third Knockout drum is positioned downstream of the first Knockout drum and upstream of the compressor; and
    separating residual liquid from the filtered hydrocarbon based gas stream by use of the third Knockout drum prior to directing the filtered hydrocarbon based fluid stream to the compressor.

2. The method of claim 1, wherein the one or more filters (a) partially fill the Knockout drum or (b) substantially completely fills the Knockout drum.

3. The method of claim 1, wherein the plurality of pores are distributed along the one or more reticulated particle traps as a gradient.

4. The method of claim 1, wherein the one or more reticulated particle traps have a homogenous distribution of pores.

5. The method of claim 1, wherein the one or more reticulated particle traps have a randomly selected pore size.

6. A method for reducing contaminants in a hydrogen or hydrocarbon based gas stream in a transportation fuel refinery to extend a compressor's maintenance time, the method comprising:
    directing the hydrogen or hydrocarbon based gas stream to flow into a first Knockout drum, the first Knockout drum being a two-phase separator;
    separating at least a portion of entrained liquid from gas in the hydrogen or hydrocarbon based gas stream;
    passing the gas through a plurality of pores of one or more reticulated particle traps to entrap at least a portion of solid foulant as the gas passes therethrough;
    expelling the gas from the first Knockout drum to form a filtered hydrogen or hydrocarbon based gas stream;
    directing the filtered hydrogen or hydrocarbon based gas stream to the compressor for compression, the filtered hydrogen or hydrocarbon based gas stream including reduced contaminants to extend the compressor's maintenance time;
    monitoring a pressure of the gas expelled from the first Knockout drum; and
    maintaining a second Knockout drum as a backup to the first Knockout drum while the pressure of the gas expelled from the first Knockout drum is within a selected threshold, wherein a third Knockout drum is positioned downstream of the first Knockout drum and upstream of the compressor; and
    separating residual liquid from the filtered hydrogen or hydrocarbon based gas stream by use of the third Knockout drum prior to directing the filtered hydrogen or hydrocarbon based gas stream to the compressor.

7. The method of claim 6, further comprising: when the pressure of the gas expelled from the first Knockout drum exceeds the selected threshold,
  re-directing the hydrocarbon based gas stream to flow into the second Knockout drum instead of the first Knockout drum;
  separating at least a portion of entrained liquid from gas in the hydrocarbon based gas stream;
  passing the gas through a plurality of pores of one or more filters reticulated particle traps to entrap solid foulant as the gas passes therethrough;
  expelling the gas from the second Knockout drum to form a filtered hydrocarbon based gas stream;
  directing the filtered hydrocarbon based gas stream to the compressor for compression, the filtered hydrocarbon based gas stream including reduced contaminants to extend the compressor's maintenance time; and
  cleaning or replacing the one or more reticulated particle traps positioned within the first Knockout drum.

8. The method of claim 7, further comprising:
  monitoring a pressure of the gas expelled from the second Knockout drum; and
  while the pressure of the gas expelled from the second Knockout drum is within a selected threshold, maintaining the first Knockout drum as a backup to the second Knockout drum.

9. The method of claim 8, wherein the cleaning of the one or more reticulated particle traps comprises pumping water through the plurality of pores of the one or more reticulated particle traps in the first Knockout drum.

10. The method of claim 7, wherein the one or more reticulated particle traps in the second Knockout drum are one of (a) the same as the one or more reticulated particle traps in the first Knockout drum or (b) different than the one or more reticulated particle traps in the first Knockout drum.

11. The method of claim 6, wherein the third Knockout drum includes one or more reticulated particle traps.

12. The method of claim 6, wherein the plurality of pores of the one or more reticulated particle traps of the first Knockout drum are distributed as a gradient.

13. The method of claim 6, wherein the one or more reticulated particle traps are configured to entrain solid foulant of varying sizes.

14. The method of claim 6, wherein the compressor includes one or more filters, and the method further comprises separating residual solid foulant from the filtered hydrocarbon gas stream by use of the one or more filters.

15. A foulant reducing system to reduce foulants in a hydrogen or hydrocarbon based gas stream in a transportation fuel refinery prior to compression via a compressor to extend a maintenance time of the compressor, the system comprising:
  the compressor;
  a first pipeline;
  a second pipeline;
  a first Knockout drum connected to the first pipeline and the second pipeline, and including one or more reticulated particle traps;
  a third pipeline connected to the second pipeline;
  a second Knockout drum connected to the first pipeline and the third pipeline;
  a third Knockout drum connected to the second pipeline, wherein the compressor is connected to the third Knockout drum;
  one or more sensors configured to monitor a pressure of the system and to transmit the pressure as data; and
  a controller configured to receive data from the one or more sensors, the controller configured to:
  direct the gas stream to flow into the first Knockout drum, the first Knockout drum being a two-phase separator configured for separating at least a portion of entrained liquid from gas in the gas stream by passing the gas stream through a plurality of pores of the one or more reticulated particle traps in the first Knockout drum to entrap at least a portion of solid foulant as the gas passes therethrough to form a filtered gas stream that is expelled from the first Knockout drum to the third knockout drum;
  direct the filtered gas stream from the third knockout drum to the compressor for compression, the filtered gas stream including reduced contaminants to extend the compressor's maintenance time;
  monitor a pressure of the gas expelled from the first Knockout drum; and
  maintain the second Knockout drum as a backup to the first Knockout drum while the pressure of the gas expelled from the first Knockout drum is within a selected threshold, wherein the third Knockout drum is positioned downstream of the first Knockout drum and upstream of the compressor; and
  wherein the third Knockout drum is configured for separating residual liquid from the filtered gas stream.

16. The system of claim 15, wherein the first Knockout drum and the second Knockout drum further include one or more inlets accessible to the gas stream via connection to the first pipeline and one or more outlets configured to expel gas so as to define a gas outlet stream via connection to the second pipeline and the third pipeline, wherein the controller is in communication with a flow control device, the flow control device configured to direct the gas stream to the second Knockout drum if a differential between a pressure of the gas outlet stream of the first Knockout drum and a set pressure limit reaches or exceeds a set differential limit.

17. The system of claim 15, wherein the first Knockout drum and the second Knockout drum further include one or more inlets accessible to the gas stream via connection to the first pipeline and one or more outlets configured to expel gas so as to define a gas outlet stream via connection to the second pipeline and the third pipeline, wherein the controller is in communication with a flow control device, the flow control device configured to direct the fluid feed gas stream to the first Knockout drum if a differential between a pressure of the gas outlet stream of the second Knockout drum and a set pressure limit reaches or exceeds a set differential limit.

18. A system to reduce foulants in a hydrogen or hydrocarbon based gas stream in a transportation fuel refinery prior to compression via a compressor to extend a maintenance time of the compressor, the system comprising:
  the compressor;
  a first Knockout drum comprising one or more reticulated particle traps within the first Knockout drum, wherein the first Knockout drum is a two-phase separator;
  a second Knockout drum;
  a third Knockout drum positioned downstream of the first Knockout drum and upstream of the compressor;
  a flow control device;
  a controller; and
  a first pressure sensor positioned within, on or proximate to the first Knockout drum and configured to measure pressure within the first Knockout drum;
  wherein the controller is configured to monitor the pressure within the first knockout drum via the first pressure sensor, and while the pressure within the first Knockout drum is below a selected threshold, control the flow control device such that the gas stream flows through the first Knockout drum, into the third Knockout drum and into the compressor, with the second Knockout drum being maintained as a backup to the first Knockout drum, wherein the one or more reticulated particle traps within the first Knockout drum is configured to separate at least a portion of entrained liquid and foulants from the gas stream as the gas stream passes through a plurality of pores of the one or more reticulated particle traps.

19. The system of claim 18, wherein the controller is further configured to:

if the pressure within the first Knockout drum is above the selected threshold:

adjust the flow control device to cause the gas stream to be directed to the second Knockout drum.

20. The system of claim 19, wherein the controller is further configured to:

while the gas stream is directed to the second Knockout drum, maintain the first Knockout drum as the backup.

21. The system of claim 20, wherein the controller is further configured to:

while the first Knockout drum is the backup, clean the one or more reticulated particle traps within the first Knockout drum.

22. The system of claim 18, wherein flow control device includes one or more of a control valve, or a pump.

* * * * *